Feb. 22, 1938.  E. E. HEWITT  2,109,046
ELECTROPNEUMATIC BRAKE APPARATUS
Filed June 2, 1937  2 Sheets-Sheet 1

INVENTOR
ELLIS E. HEWITT
BY Wm. M. Cady
ATTORNEY

Feb. 22, 1938.  E. E. HEWITT  2,109,046
ELECTROPNEUMATIC BRAKE APPARATUS
Filed June 2, 1937  2 Sheets-Sheet 2
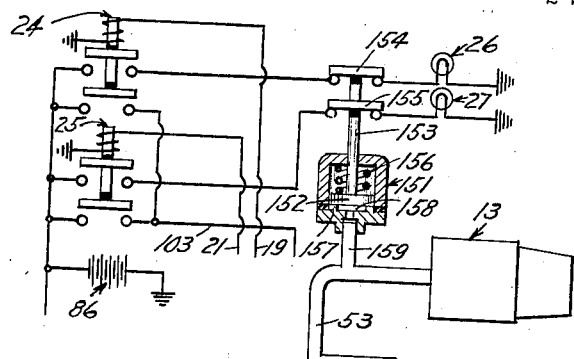
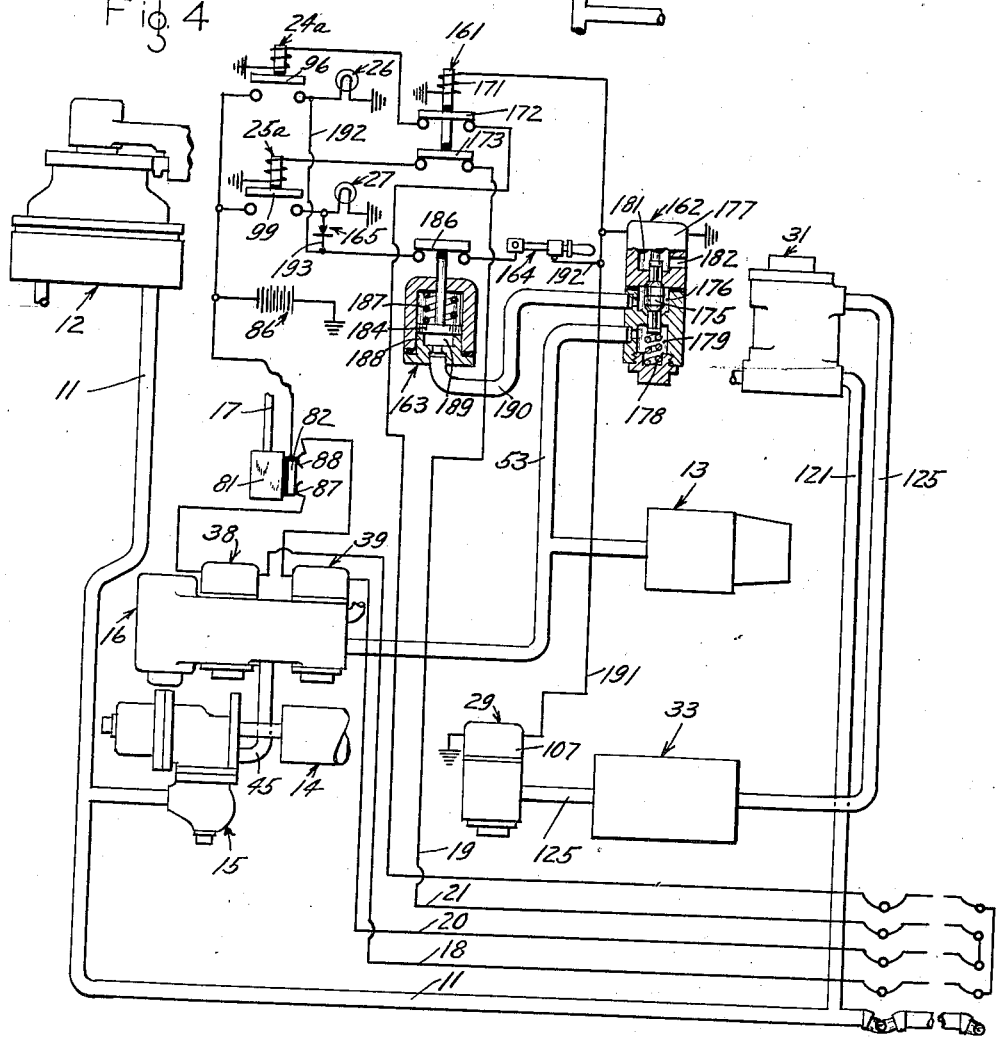
INVENTOR
ELLIS E. HEWITT
BY *Wm. M. Cady*
ATTORNEY Patented Feb. 22, 1938

2,109,046

UNITED STATES PATENT OFFICE 2,109,046

ELECTROPNEUMATIC BRAKE APPARATUS

Ellis E. Hewitt, Edgewood, Pa., assignor to The Westinghouse Air Brake Company, Wilmerding, Pa., a corporation of Pennsylvania Application June 2, 1937, Serial No. 145,976

16 Claims. (Cl. 303—15)

This invention relates to electro-pneumatic brake apparatus and particularly to electro-pneumatic brake apparatus having signal equipment for signaling a fault, break or other failure of the electrical circuits, and means for causing an automatic application of the brakes upon the failure of the electrical circuits.

It is an object of this invention to provide an electro-pneumatic brake apparatus including a retardation controller for automatically regulating the degree of braking force so as to cause deceleration of the vehicle or train at a substantially constant rate and including signal equipment which functions at one time to indicate the operative condition of the retardation controller and at another time to indicate a fault or other failure in the electrical control circuits.

Another object of the invention is to provide an electro-pneumatic brake apparatus of the character indicated in the foregoing object and including normally closed brake control circuits having means responsive to the interruption of the control circuits to automatically effect an application of the brakes, and including means for preventing an automatic application of the brakes upon interruption of the control circuits due to the normal operation of the retardation controller.

The above objects, and other objects which will be made apparent hereinafter, are attained by several embodiments of my invention subsequently to be described and shown in the accompanying drawings, wherein, Fig. 1 is a diagrammatic view of an electro-pneumatic brake apparatus for a train of cars, illustrating one embodiment of my invention, Fig. 2 is a fragmentary diagrammatic view, illustrating the operation of the retardation controller shown in Fig. 1, Fig. 3 is a fragmentary diagrammatic view, illustrating a modification of the embodiment shown in Fig. 1, and Fig. 4 is a diagrammatic view of an electro-pneumatic brake apparatus, illustrating another embodiment of my invention.

*Description of embodiment shown in Figs. 1 and 2*

The train brake equipment, shown in Fig. 1, includes a brake pipe 11 which extends through all the cars of the train, a brake valve device 12 of any well known type used in automatic fluid pressure brake systems for controlling the charging and the release of fluid under pressure from the brake pipe, a plurality of brake cylinders 13, 13a and 13b associated with wheel trucks on different cars respectively, a plurality of auxiliary reservoirs 14, 14a and 14b on the different cars respectively, and a plurality of automatic valve devices 15, 15a and 15b, illustrated as triple valves, which are controlled according to the variations of pressure in the brake pipe 11 for causing the charging of the auxiliary reservoirs from the brake pipe and the supply of fluid under pressure from the auxiliary reservoirs 14, 14a and 14b to the brake cylinders 13, 13a and 13b, respectively.

The equipment further includes a plurality of valve mechanisms 16, 16a and 16b interposed, respectively, between each triple valve and the corresponding brake cylinder and controlled by a retardation controller 17, located on one of the cars, through the medium of a plurality of train wires 18, 19, 20 and 21.

Operating on the brake control circuits, which include the train wires 18 to 21, are two relays 24 and 25 which respectively control the circuits for two signal lamps 26 and 27.

A magnet valve device 29 controlled by either of the relays 24 or 25 in turn controls the operation of an application valve device 31 to effect rapid reduction of the pressure in the brake pipe 11.

A cut-off valve device 32, controlled by the pressure in the brake cylinder 13, is provided for preventing the magnet valve device 29 from causing operation of the application valve device 31. A timing reservoir 33 associated with the application valve device 31 functions to delay the operation of the application valve device 31 for a certain length of time upon operation of the magnet valve device 29.

The brake valve device 12 may be of any suitable type but, for simplicity, it will be assumed to be of the simple rotary type having a rotary valve, not shown, which is operated by an operating handle 35 into a brake release position, a service application position, a lap position and an emergency application position. With the rotary valve of the brake valve device 12 in brake release position, communication is established between a pipe 36 that is connected to a source of fluid pressure supply, such as a main reservoir, not shown, and the brake pipe 11 to charge the brake pipe to the normal pressure carried therein. With the rotary valve of the brake valve device 12 in service application position, the connection from the pipe 36 to the brake pipe 11 is cut off or closed and communication established for reducing the pressure in the brake pipe 11 at a service rate. In a similar manner, with the rotary valve of the brake valve device 12 in emergency application position, the connection between the pipe 36 and the brake pipe 11 is closed and a communication is established for reducing the pressure in the brake pipe 11 at an emergency rate. With the rotary valve of the brake valve device 12 in lap position, the connection between the pipe 36 and the brake pipe 11 is closed and the exhaust communication effective in service or emergency application positions is lapped or closed and the brake pipe 11 thereby isolated.

The automatic valve devices or triple valves 15, 15a and 15b are of well known construction and need no description herein except to point out that they are operated upon a reduction in brake pipe pressure at a service rate to supply fluid under pressure from the auxiliary reservoirs 14, 14a and 14b to the brake cylinders 13, 13a and 13b, respectively, to effect service applications of the brakes on the train. Upon an increase in the pressure of the brake pipe 11, the triple valves 15, 15a and 15b are operated to establish communication through which pressure is released from the brake cylinders 13, 13a and 13b, respectively, and communication through which the auxiliary reservoirs 14, 14a and 14b are charged with fluid under pressure from the brake pipe 11.

The magnet valve mechanisms 16, 16a and 16b are identical in construction and accordingly only the valve mechanism 16 is shown in section and described herein. The magnet valve mechanism 16 comprises a cut-off magnet valve device 38, a release magnet valve device 39, an inshot valve device 41, and a safety valve 42.

The cut-off magnet valve device comprises a valve 43, hereinafter called the cut-off valve, which is contained in a chamber 44 constantly connected to the usual brake cylinder port of the triple valve 15 through a passage and pipe 45, and an electromagnet 46 for operating the valve 43. When energized, the electromagnet 46 actuates a plunger or stem 47 to unseat the cut-off valve 43 against the resistance of a biasing spring 48 contained in the chamber 44. When the cut-off valve 43 is unseated it establishes communication therepast from the chamber 44 to a chamber 49, which is connected through a passage 51 to a chamber 52 and, from the chamber 52, through a pipe 53 to the brake cylinder 13. When the electromagnet 46 is deenergized, spring 48 urges the valve 43 into seated relation on an associated valve seat to cut off communication between the chamber 44 and the chamber 49.

The release magnet valve 39 comprises a valve 56, hereinafter called the release valve, and an electromagnet 57 for operating the valve 56. The valve 56 is contained in a chamber 58 which is connected through a pipe 59 to the safety valve 42.

When the electromagnet 57 is energized, it actuates a plunger or stem 61 to shift the release valve 56 into seated engagement on an associated valve seat against the force of a biasing spring 62 contained in chamber 52. When the electromagnet 57 is deenergized, the spring 62 unseats the release valve 56 and communication is thereby established past the release valve from the chamber 52 and the connected brake cylinder 13 to the chamber 58 and the connected safety valve 42. As will be hereinafter explained, the safety valve 42 is set so as to permit release of fluid under pressure therethrough from the brake cylinder to atmosphere only when the pressure exceeds a certain predetermined pressure.

The inshot valve device 41 comprises a ball check valve 65, that is contained in a chamber 66 connected to the chamber 44 through a passage 67, and a piston 68 having at one side a stem 69 and yieldingly urged upwardly into engagement with an annular rib seat 71 by a coil spring 72 at the opposite side of the piston. When the piston 68 is in its upper position shown, the stem 69 engages and unseats the ball check valve 65 to open communication between the chamber 66 and a passage 73 leading to the chamber 49.

It will thus be seen that as long as the ball check valve 65 is unseated, fluid under pressure may be supplied from the chamber 44 to the chamber 49 and to the brake cylinder 13 in parallel or by-pass relation to the cut-off valve 43 under the control of the triple valve device 15, notwithstanding the fact that the cut-off valve 43 may be seated.

The piston 68 is subject to brake cylinder pressure on the side thereof opposite to the spring 72, as will be apparent, and as long as the brake cylinder pressure acting on the piston does not exceed a certain pressure, such as twenty or thirty pounds per square inch, the spring 72 holds the piston 68 in its upper position to maintain the ball check valve 65 unseated. When the brake cylinder pressure exceeds the certain uniform pressure, the spring 72 yields and the piston 68 is urged downwardly into engagement with a gasket seat 75, whereby leakage of fluid under pressure past the piston is prevented. When seated on the gasket seat 75, the piston 68 is lowered so that the stem 69 thereof is retracted from the ball check valve 65. The ball check valve 65 now seats to prevent the flow of fluid under pressure from the chamber 66 to the passage 73 in by-pass relation to the cut-off valve 43, but is adapted to unseat at any time to permit reverse flow of fluid under pressure therepast.

The retardation controller device 17 may be of any suitable type, and is illustrated diagrammatically as comprising an inertia member in the form of a pendulum 81 which hangs in a vertical position as shown in Fig. 1 as long as the vehicle or train is stopped or as long as the vehicle or train is traveling at a substantially constant rate of speed. The pendulum 81 carries, in insulated relation thereon, a contact member 82 which is constantly connected as by a wire 83, including a flexible portion 84, and by a branch wire 85 to one terminal of a battery 86 hereinafter called the positive terminal. When the pendulum 81 is in its normal vertical position, the contact member 82 engages two spring-tensioned contact fingers 87 and 88 which are connected by wires 89 and 91, respectively, to corresponding terminals of the electromagnets 46 and 57 of the magnet valve devices 38 and 39 of the magnet valve mechanism 16.

Upon the retardation of the vehicle or train when traveling in a forward direction, the pendulum 81 shifts in the left-hand direction as viewed in Fig. 1, the contact fingers 87 and 88 being so disposed, as shown in Fig. 2, that the contact member 82 at first disengages only the contact finger 87 and, subsequently, the contact finger 88.

The relay 24 is illustrated diagrammatically as comprising an electromagnet 95 and a pair of contact members 96 and 97 which are urged to a circuit-closing position when the electromagnet 95 is deenergized and which are actuated to a circuit-opening position when the electromagnet 95 is energized. The relay 25 is identical to the relay 24 and comprises an electromagnet 98 and a pair of contact members 99 and 101, which are urged to a circuit-closing position when the electromagnet 98 is deenergized and which are actuated to a circuit-opening position when the electromagnet 98 is energized.

As is clearly apparent in Fig. 1, the contact members 96 and 99 of the relays 24 and 25, when in circuit-closing position, complete circuits including the battery 86 and thus cause energization and consequent illumination of the signal lamps 26 and 27 respectively. The contact members 97 or 101 of the relays 24 and 25, respectively, are each effective, when in circuit-closing position, to connect the positive terminal of the battery 86 to a wire 103 which is connected to one terminal of the electromagnet of the magnet valve device 29.

The magnet valve device 29 comprises a valve 105, which is contained in a chamber 106, and an electromagnet 107 which is effective when energized to actuate a plunger 108 to unseat the valve 105 against the resistance of a yielding spring 109. When the valve 105 is unseated, it establishes communication from the chamber 106 to a chamber 111 which is constantly open to atmosphere through an exhaust port 112.

The application valve device 31 comprises a casing 114 containing a valve piston 116 which is normally yieldingly urged by a coil spring 117 into seated engagement on an annular rib seat 118 to close communication from a chamber 119, which is constantly connected to the brake pipe 11 by a branch pipe 121, to a chamber 122 which is constantly open to atmosphere through a large exhaust port 120. On the same side of the valve piston 116 acted upon by the spring 117 is a chamber 123 which is connected to the chamber 119 through a restricted port 124 and to the timing reservoir 33 through a pipe 125.

When the brake pipe 11 is charged to its normal pressure, fluid under pressure is supplied therefrom through the restricted port 124 to the chamber 123 and the combined force of the spring 117 and the pressure of the fluid in the chamber 123 is effective to maintain the valve piston 116 seated on the annular rib seat 118 against the opposing force of brake pipe pressure acting on the outer seated area of the valve piston 116 in the chamber 119. Upon a reduction of the pressure in the chamber 123, the rate of flow of fluid under pressure from the chamber 119 to the chamber 123 is restricted by the port 124 and consequently the higher brake pipe pressure acting on the outer seated area of the valve piston 116 shifts the valve piston 116 upwardly against the resistance of the spring 117 and unseats it from the annular rib seat 118 to establish communication from the chamber 119 to the atmospheric chamber 122, thereby causing a sudden reduction of the pressure in the brake pipe 11 at an emergency rate.

When the pressure in the chambers 119 and 123 is subsequently equalized, the spring 117 becomes effective to reseat the valve piston and thus close the connection from the chamber 119 to the atmospheric chamber 122.

The cut-off valve device 32 comprises a casing 126 containing a diaphragm type valve 127 which is suitably clamped in the casing and which is normally positioned to establish communication through a port 128 between a chamber 129, which is connected to the chamber 106 of the magnet valve device 29 by a pipe 131, and a chamber 132 that is connected by the pipe 125 to the timing reservoir 33. Also suitably clamped in the casing 126 is a diaphragm 134 which is effective, when subject to fluid under pressure in a chamber 135 at one side thereof, to shift the diaphragm valve 127 into seated relation to close communication between the chambers 129 and 132 through the port 128. The supply and release of fluid under pressure to and from the chamber 135 is under the control of a valve piston 136 which is normally urged by a coil spring 137 at one side thereof into seated relation on an associated valve seat to close communication through a port 138 connecting the chamber 135 to a chamber 139 which is constantly connected to the brake cylinder through a branch pipe 141 of the brake cylinder pipe 53. The coil spring 137 is so designed and so adjusted in tension as to maintain the valve piston 136 seated on its associated valve seat against the brake cylinder pressure acting in chamber 139 on the inner seated area thereof, as long as the brake cylinder pressure does not exceed a certain uniform pressure, such as ten pounds per square inch. When the brake cylinder pressure acting on the valve piston 136 in chamber 139 increases sufficiently to unseat the valve piston against the resistance of the spring 137, the entire face of the piston becomes subject to the pressure in the brake cylinder and the valve piston is accordingly suddenly snapped upwardly into seated relation on a gasket seat 142 to close off the normal exhaust communication from the chamber 135 to atmosphere through exhaust ports and passage 143. When the brake cylinder pressure in the chambers 135 and 139 is ineffective to maintain the valve piston 136 unseated against the force of the spring 137, the valve piston 136 is shifted downwardly to close the port 138 and to open the communication through which fluid under pressure is vented to atmosphere from the chamber 135 through the exhaust ports and passage 143.

It will be apparent that, with the diaphragm valve 127 of the cut-off valve device 32 unseated, energization of the electromagnet 107 of the magnet valve device 29 is effective to establish communication through which the timing reservoir 33 and connected chamber 123 of the application valve device 31 are vented to atmosphere. The port 112 and the timing reservoir 33 provide a certain time delay, such as three or four seconds, following the energization of the electromagnet 107 of the magnet valve device 29, before sufficient pressure reduction is effected in the chamber 123 of the application valve device 31 to cause unseating of the valve piston 116 and the consequent reduction in brake pipe pressure. Thus, momentary accidental deenergization of the magnet valve device 29 does not result in undesired operation of the application valve device 31.

It will also be apparent that when the diaphragm valve 127 of the cut-off valve device 32 is seated to close the port 128, energization of the magnet valve device 29 is ineffective to cause operation of the application valve device 31.

The circuits by which the retardation controller 17 controls energization and deenergization of the magnet valve devices 38 and 39 of the magnet valve mechanisms 16, 16a and 16b as well as of the relays 24 and 25 should be readily apparent. It will be seen that the electromagnets 46 of magnet valve devices 38 are all connected in series relation in the train wire 18, that the train wire 18 is connected through a connector 151 on the last car of the train to the train wire 19, and that the electromagnet 95 of the relay 24 is connected in series relation in the train wire 19, which is in turn connected, as through a ground connection in the manner shown, to the negative or grounded terminal of the battery 86.

It will be apparent also, that the electromagnets 57 of the magnet valve devices 39 are connected in series relation in the train wire 20, that the train wire 20 is connected through a connector 152 at the rear end of the train to the train wire 21, which is in turn connected as through a ground connection at the head end of the train in the manner shown, to the negative terminal of the battery 86, the electromagnet 98 of the relay 25 being connected in series relation in the train wire 21.

With the pendulum 81 of the retardation controller in its normal vertical position, the control circuits just described are closed. When the pendulum 81 of the retardation controller 17 shifts sufficiently in the left-hand direction to cause the contact member 82 thereof to disengage the contact finger 87, the circuit for energizing relay 24 and the magnet valve devices 38 is interrupted. When contact member 82 on the pendulum 81 disengages contact finger 88, the circuit for energizing the relay 25 and the magnet valve devices 39 is interrupted.

*Operation of embodiment shown in Fig. 1*

Let it be assumed that the brake pipe 11 is charged to a normal pressure by placing the operating handle 35 of the brake valve device 12 in brake release position and that the triple valve devices 15, 15a and 15b are correspondingly conditioned to charge the auxiliary reservoirs 14, 14a and 14b and establish the usual exhaust communication whereby the pipe 45 leading to the brake cylinders is connected to atmosphere and fluid under pressure correspondingly exhausted from the brake cylinders to effect release of the brakes. Let it be further assumed that the vehicle or train is traveling along the road at a substantially constant rate of speed so that the pendulum 81 of the retardation controller 17 is in its normal vertical position completing the circuits just previously described for energizing the magnet valve devices 38 and 39 of the magnet valve mechanisms 16, 16a and 16b and also the electromagnets 95 and 98 of the relays 24 and 25, respectively.

The cut-off valves 43 are correspondingly unseated and the release valves 56 correspondingly seated so that the exhaust communication for releasing fluid under pressure from the brake cylinders is established by way of the pipe 53, chamber 52, passage 51, chamber 49, past the unseated cut-off valve 43, chamber 44, passage and pipe 45 and through the triple valve to atmosphere. At the same time, the contact members 96 and 99 of the relays 24 and 25 are shifted to circuit-opening position and the signal lamps 26 and 27 are correspondingly extinguished. Also magnet valve device 29 is deenergized and valve 105 thereof seated since contact members 97 and 101 of relays 24 and 25 are both in circuit-opening position.

Since the brake pipe 11 is charged, the timing reservoir 33 is also charged correspondingly with fluid under pressure by way of the branch pipe 121, chamber 119 of the application valve device 31, restricted port 124 and chamber 123, so that the valve piston 116 of the application valve device 31 is seated. Since the brake cylinder 13 is at atmospheric pressure, the valve piston 136 of the cut-off valve device 32 is seated to close the port 138 and thus fluid under pressure is vented from the chamber 135 to atmosphere by way of the ports and passage 143. The diaphragm valve 127 is accordingly unseated and, although fluid under pressure is supplied to chamber 106 of the magnet valve device 29 from the timing reservoir 33 through the pipe 125, chamber 132 of the cut-off valve device 32, open port 128, chamber 129, and pipe 131, the seated valve 105 prevents exhaust of fluid to atmosphere through port 112.

Let it now be assumed that the operator effects a service application of the brakes by shifting the operating handle 35 of the brake valve device 12 to a service application position. The pressure in the brake pipe 11 accordingly reduces at a service rate and the triple valve devices 15, 15a and 15b are correspondingly operated to establish communication in the usual manner through which fluid under pressure is supplied from the auxiliary reservoirs 14, 14a and 14b, respectively, to the brake cylinders 13, 13a and 13b, respectively. When the desired degree of service application has been attained the operator shifts the operating handle 35 to lap position thereby cutting off further reduction of the pressure in the brake pipe 11 and causing the triple valves 15, 15a and 15b to respond in the usual manner and operate to a lap position to cut off the further supply of fluid under pressure from the auxiliary reservoirs to the brake cylinders and maintain the pressure established in the brake cylinders.

When the pressure in the brake cylinder exceeds the pressure, for example ten pounds per square inch, required to unseat the valve piston 136 of the cut-off valve device 32, brake cylinder pressure is admitted to the chamber 135 and by acting on the diaphragm 134 causes the diaphragm valve 127 to be shifted into seated position to close the port 128.

Now let it be assumed that due to the service application of the brakes effected in the manner just described, the train is retarded at such a rate as to cause the pendulum 81 of the retardation controller 17 to shift in the left-hand direction sufficiently to disengage the contact finger 87, which may occur at, for example, a rate of retardation of the train of three miles per hour per second. The disengagement of the contact member 82 on the pendulum 81 from the contact finger 87 interrupts the circuit for energizing the electromagnets 46 of the magnet valve devices 38 as well as the electromagnet 95 of the relay 24. As a result, the cut-off valves 43 of all the valve devices 38 are actuated to seated position and the contact members 96 and 97 of the relay 24 are shifted to circuit-closing position.

The contact member 96 of relay 24, when in circuit-closing position, completes the circuit for energizing the signal lamp 26 which is accordingly illuminated to indicate to the operator that the retardation controller 17 has operated to close the cut-off valves 43.

The contact member 97 of the relay 24, when in circuit-closing position, completes the circuit for energizing the electromagnet 107 of the magnet valve device 29 and the valve 105 is accordingly unseated. Due to the fact that the diaphragm valve 127 of the cut-off valve 32 is seated, the only effect of the unseating of the valve 105 of the magnet valve 29, in this instance, is to release fluid under pressure from the chamber 129 of the cut-off valve device 32 and chamber 106 of the magnet valve device 29 through the exhaust port 112.

With the brake cylinder pressure remaining unchanged, the rate of retardation of the train increases as the speed of the train decreases due to the increase in the coefficient of friction between the brake shoes and the rim of the vehicle wheels. Thus, the pendulum 81 of the retardation controller 17 shifts to a further extent in the left-hand direction and disengages the contact finger 88 of the retardation controller 17 at, for example, a rate of retardation of four miles per hour per second. The disengagement of the contact member 82 on the pendulum 81 from the contact finger 88 interrupts the circuit for energizing the electromagnet 57 of each release magnet valve device 39 and also the electromagnet 98 of the relay 25. As a result, the release valves 56 are unseated and the pressure in the brake cylinders 13 reduced to a pressure determined by the setting of safety valve 42 which pressure is only a few pounds per square inch higher than the pressure required to effect operation of the inshot valve device 68. Accordingly, if the pressure in the brake cylinder 13 is higher than the pressure setting of the safety valve 42, fluid under pressure is released from the brake cylinder, thereby effecting a reduction in the degree of the retarding force on the train and a corresponding decrease in the rate of retardation of the train.

Contact member 99 of relay 25 is shifted to circuit closing position as a result of the deenergization of the electromagnet 98 and completes the circuit for energizing the signal lamp 27 which is accordingly illuminated to indicate to the operator that the retardation controller 17 has operated to effect the release of fluid under pressure from the brake cylinder. The shifting of contact member 101 of relay 25 to circuit-closing position as a result of deenergization of electromagnet 98 is without effect, since it merely establishes a parallel circuit around the contact member 97 of relay 24 which is already in circuit-closing position.

When the rate of retardation of the train decreases sufficiently that the pendulum 81 returns in a right-hand direction back toward its normal vertical position sufficiently to effect reengagement of the contact member 82 thereon with the contact finger 88, the circuit for energizing the electromagnet 57 of each release magnet valve device 39 and of the electromagnet 98 of the relay 25 is again established. Accordingly, the release valves 56 are re-seated and the contact members 99 and 101 of the relay 25 actuated to circuit-opening position. Signal lamp 27 is consequently extinguished, indicating to the operator that the release of fluid under pressure from the brake cylinder has ceased.

It will thus be apparent that as long as the brake cylinder pressure exceeds a certain uniform low pressure as determined by the pressure setting of the cut-off valve device 32, the interruption of the control circuits for the cut-off magnet valve devices 38 and release magnet valve devices 39 as well as the relays 24 and 25 under the control of the retardation controller 17 results merely in the normal control exercised by the retardation controller, the signal lamps 26 and 27 being illuminated to indicate the respectively corresponding operative conditions of the retardation controller.

When the train comes to a complete stop, the pendulum 81 of the retardation controller 17 returns to its normal vertical position in which the contact member 82 engages both the contact fingers 87 and 88 and the cut-off magnet valve devices 38 and release magnet valve devices 39 are correspondingly positioned as shown in Fig. 1. The operator may, therefore, by operation of the brake valve device 12 increase brake cylinder pressure to any desired degree to hold the train against creepage on a grade.

When it is desired to start the train, the operator may release the brakes by shifting the operating handle 35 of the brake valve device 12 to release position, thereby restoring the normal pressure in the brake pipe 11 and causing operation of the triple valve devices 15, 15a and 15b in the usual manner to recharge the auxiliary reservoirs 14, 14a and 14b and to release fluid under pressure from the brake cylinders 13, 13a and 13b.

Now let it be assumed that while the train is traveling along the road at a substantially constant speed, one of the train wire or brake control circuits, for example the circuit including train wires 18 and 19, fails due to breakage thereof or the occurrence of a ground or other fault thereon. The cut-off magnet valve devices 38 and the relay 95 are accordingly deenergized in the same manner as if the contact member 82 of the retardation controller had disengaged the contact finger 87. Due to the deenergization of the electromagnet 46 of each cut-off valve device 38, the cut-off valve 43 is shifted to seated position to cut off communication therepast to the brake cylinder. Upon deenergization of the electromagnet 95 of the relay 24, the contact members 96 and 97 thereof are shifted to circuit-closing position to effect the illumination of the signal lamp 26 and energization of the electromagnet 107 of the magnet valve device 29, respectively.

Since the brakes are released, and only atmospheric pressure acts in chamber 135 on the diaphragm 134 of the cut-off valve device 32, the diaphragm valve 127 is unseated, and thus the unseating of the valve 105 of the magnet valve device 24, due to the energization of the electromagnet 107, establishes communication through which fluid under pressure is exhausted from the volume reservoir 33 and chamber 123 of the application valve device 31.

After a certain uniform time interval, therefore, determined by the capacity of the volume reservoir 33 and the size of the port 112 of the magnet valve device 29, the pressure in the chamber 123 of the application valve device 31 is reduced and the valve piston 116 thereof accordingly unseated in the manner previously described to rapidly reduce the pressure in the brake pipe 11 at an emergency rate.

Upon the reduction of the pressure in the brake pipe 11 at an emergency rate, the triple valve devices 15, 15a and 15b respond in the usual manner to rapidly supply fluid under pressure from the auxiliary reservoirs 14, 14a and 14b, respectively, to the brake cylinders 13, 13a and 13b respectively, to effect an emergency application of the brakes.

In view of the fact that the cut-off valves 43 are seated, however, fluid under pressure can be supplied from the brake cylinder pipe 45 to the brake cylinders only by way of chamber 44, passage 67, chamber 66, past the unseated ball check valve 65 of the inshot valve device 41, passage 73, chamber 49, passage 51, chamber 52, and pipe 53.

The degree of brake cylinder pressure attained in the emergency application of the brakes is, however, limited according to the pressure setting of the inshot valve device 41. As previously indicated, a brake cylinder pressure of, for example, twenty or thirty pounds per square inch causes seating of the check valve 65. Thus, when the pressure of the fluid supplied to the brake cylinder 13 is sufficient to cause seating of the check valve 65, further supply of fluid under pressure to the brake cylinder is cut off. It will thus be apparent that upon the failure of the brake control circuit including the train wire 18 and the train wire 19, the signal lamp 26 is illuminated and an automatic emergency application of the brakes is effected.

In a similar manner, if the brake control circuit including the train wires 20 and 21 breaks or fails due to a ground or other fault thereon while the train is traveling along the road with the brakes released, the electromagnet 57 of the release magnet valve devices 39 and the electromagnet 98 of the relay 25 are deenergized. As a result of the deenergization of each release magnet valve device 39, each release valve 56 is unseated. As a result of the deenergization of the relay 25, the contact member 99 thereof is shifted to circuit-closing position to cause energization of the signal lamp 27 and the contact member 101 is shifted to circuit-closing position to cause energization of the electromagnet 107 of the magnet valve device 29.

After a predetermined time interval, determined by the capacity of the volume reservoir 33 and the size of the port 112 of the magnet valve device 29, the pressure in chamber 123 of the application valve device 31 is reduced and the application valve device 31 is operated to reduce the pressure in the brake pipe 11 at an emergency rate, as in the case of breakage of or fault on the circuit including the wires 18 and 19. As in the previous instance, reduction of the pressure in the brake pipe 11 at an emergency rate causes operation of the triple valve devices 15, 15a and 15b to supply fluid under pressure from the auxiliary reservoirs 14, 14a and 14b to the brake cylinders 13, 13a and 13b, respectively.

In this instance, however, when brake cylinder pressure is built up sufficiently and check valve 65 of the inshot valve device 41 is seated to cut off the flow of fluid under pressure to the brake cylinder therepast, fluid under pressure continues to be supplied past the unseated cut-off valve 43.

Since, as previously indicated, the pressure setting of safety valve 42 is a few pounds per square inch higher than the pressure setting of the inshot valve device 41, the pressure in each brake cylinder will build up to the pressure setting of the safety valve 42 and thereafter, fluid under pressure will escape to atmosphere past the safety valve.

It will be apparent that the signal lamps 26 and 27 selectively indicate to the operator which of the control circuits have failed and thus the operator is advised, to some extent, as to the location of the failure or fault.

Whenever an automatic emergency application of the brakes is effected due to fault on or failure of the brake control circuit, the operator immediately shifts the handle 35 of the brake valve 12 from release position to lap, service application, or emergency application position in order to cut off the charging communication through the brake valve device 12 to the brake pipe 11. This prevents the subsequent restoration of brake cylinder pressure to effect undesired automatic release of the brakes.

In order to enable the train to proceed after the occurrence of a fault on or failure of any of the brake control circuits, the operator opens the knife switch 100 in the wire 103 leading to the electromagnet of the magnet valve device 29. The magnet valve device 29 is thus deenergized regardless of the fact that the contact member 101 of the relay 25 or contact member 97 of the relay 24 may be in circuit-closing position. The valve 105 of the magnet valve device 29 is thus re-seated so that when the operator subsequently restores the operating handle 35 of the brake valve device 12 to release position, the consequent unseating of the diaphragm valve 127 of the cut-off valve device 32, due to the reduction of brake cylinder pressure below the pressure setting of the cut-off valve device, will not result in another automatic emergency application of the brakes. It will be observed, however, that either one or both of the signal lamps 26 and 27 remain illuminated to continually remind the operator of the faulty condition of the brake control circuits. It is true that in the event of a fault, breakage or other failure of any of the brake control circuits, the maximum degree of brake cylinder pressure attainable is limited thereafter either according to the pressure setting of the inshot valve device 41 or of the safety valve device 42. However, by proceeding at a reduced speed, such degree of brake application will be adequate to enable the vehicle or train to proceed to its destination or other point where a better opportunity is presented for detecting and repairing the fault or failure in the control circuits.

In the event that a fault on or breakage of one of the train wires 18 to 21 occurs during an application of the brakes when the brake cylinder pressure has already attained a degree sufficient to cause closing or seating of the diaphragm valve 127 of the cut-off valve device 32, the energization of the magnet valve device 29 due to deenergization of either one or both the relays 24 and 25 is ineffective to cause operation of the application valve device 31 to effect an emergency reduction in brake pipe pressure. Accordingly, the only result, in such a case, is the illumination of one or both of the signal lamps 26 and 27 and if it happens to be the control circuit for the release magnet valve devices 39 which is interrupted by the fault or breakage of the train wire, a reduction in brake cylinder pressure to the pressure setting of the safety valve 42.

After the train is brought to a complete stop and the operator shifts the handle 35 of the brake valve device 12 to the release position to release the brakes, the reduction of brake cylinder pressure below the setting of the cut-off valve device 32 causes unseating of the diaphragm valve 127 and, consequently, because the valve 105 of the magnet valve device 29 remains unseated, the chamber 123 of the application valve device 31 is vented and an automatic emergency application of the brakes is then effected as in the manner previously described. In the same manner as pointed out previously, it is then necessary for the operator to open the knife switch 100 to deenergize the magnet valve device 29 in order to enable the train to proceed toward its destination.

Embodiment shown in Fig. 3

The embodiment shown in Fig. 3 is identical with the embodiment shown in Fig. 1 except that a pressure-responsive switch device 151 is additionally provided for interrupting the circuit of the signal lamps 26 and 27 whenever the brake cylinder pressure exceeds a certain uniform low pressure, such as two or three pounds per square inch.

The pressure switch 151 is illustratively shown as comprising a casing containing a piston 152 which has a stem 153 carrying in insulated relation thereon a pair of contact members 154 and 155. Interposed between one face of the piston and the casing is a coil spring 156 which is effective to urge the piston into contact with an annular stop 157 on the casing when the pressure of the fluid in a chamber 158 at the opposite side of the piston is less than a certain uniform low pressure, such as two or three pounds per square inch. The chamber 158 is constantly connected to the brake cylinder pipe 53 through a branch pipe 159.

When the piston 152 of the pressure-responsive switch 151 is in engagement with the annular stop 157 the contact members 154 and 155 are correspondingly positioned in circuit-closing position in series-circuit relation with the signal lamps 26 and 27, respectively.

When an application of the brakes is effected and the brake cylinder pressure acting in chamber 158 on the piston 152 of the pressure switch 151 shifts the piston 152 upwardly against the resistance of the spring 156, the contact members 154 and 155 are shifted to circuit-opening position and thereby prevent the illumination of the signal lamps 26 and 27 to indicate the operative condition of the retardation controller 17 as in the embodiment shown in Fig. 1.

It will be apparent, however, that if a fault on or breakage of any of the brake control circuits occurs while the brakes are released, the signal lamps 26 and 27 will be illuminated, as described in the case of the embodiment shown in Fig. 1, and an automatic emergency application of the brakes will be effected.

By thus providing the pressure switch 151, the signal lamps 26 and 27 are unable to function to indicate the operating condition of the retardation controller and, therefore, the operator knows definitely that the illumination of either or both of the signal lamps 26 and 27 is due to a fault on or breakage of the control circuits.

Embodiment shown in Fig. 4

The embodiment shown in Fig. 4 is identical in most respects to the embodiment shown in Fig. 1 and differs therefrom in certain respects which will be pointed out briefly.

Instead of providing relays 24 and 25 having two contact members, the embodiment shown in Fig. 4 includes relays 24a and 25a each having only one contact member, corresponding to contact members 96 and 99 of the relays 24 and 25, respectively. Also the cut-off valve device 32 is omitted and the pipe 125 leading from the volume reservoir 33 is connected directly to the chamber 106 of the magnet valve device 29.

The equipment shown in Fig. 4 also includes certain devices not part of the equipment shown in Fig. 1, these devices including an electrical relay 161, a magnet valve device 162, a pressure switch device 163, a switch device illustrated as a knife switch 164, and a rectifier 165 preferably of the dry disc type.

The electromagnets of the relays 24a and 25a are connected in series-circuit relation with the electromagnets of the cut-off magnet valve devices 38 and the release magnet valve devices 39, respectively, as in the embodiment shown in Fig. 1 and the contact members 96 and 99 of relays 24a and 25a are adapted, when in circuit-closing position, to respectively complete the circuits connecting the signal lamps 26 and 27 to the battery 86 to effect illumination thereof.

The relay 161 comprises an electromagnet 171 effective when energized to cause shifting of a pair of contact members 172 and 173 from a normal circuit-closing position to a circuit-opening position. The contact member 172 of the relay 161 is effective, when in circuit-opening position, to interrupt the circuit for the electromagnet of the relay 24a and the electromagnet 46 of the cut-off magnet valve devices 38. The contact member 173 of the relay 161 is effective, when in circuit-opening position to interrupt the circuit for energizing the electromagnet of the relay 25a and the electromagnet 57 of the release magnet valve devices 39.

The magnet valve device 162 comprises a casing having a chamber 176 containing a double beat valve 175 which is shifted from an upper seated position to a lower seated position upon energization of an electromagnet 177. When the electromagnet 177 is deenergized, the double beat valve 175 is shifted to its upper seated position by a yielding coil spring 178 and establishes communication, past the lower open valve seat, between the chamber 176 and a chamber 179 to which the brake cylinder supply pipe 53 is constantly connected. When the double beat valve 175 is in its lower seated position, it cuts off the communication between the chambers 176 and 179 and establishes communication past the open upper seat thereof between the chamber 176 and a chamber 181 which is constantly open to atmosphere through an exhaust port 182.

The pressure switch device 163 comprises a casing containing a piston 184 which has a stem 185 carrying in insulated relation thereon a contact member 186. At one side of the piston 184 is a coil spring 187 which is interposed between the piston and the casing in such manner as to yieldingly urge the piston in one direction into engagement with an annular stop 188 on the casing. At the opposite side of the piston 184 to the spring 187 is a chamber 189 which is constantly connected to the chamber 176 of the magnet valve device 162 as by a pipe 190.

The spring 187 normally urges piston 184 into engagement with the annular stop 188, in which position the contact member 186 is correspondingly in circuit-closing position. When the pressure of the fluid supplied to the chamber 189 exceeds a uniform low pressure, such as two or three pounds per square inch, the spring 187 is overcome and the contact member 186 is shifted to circuit-opening position.

The knife switch 164 is normally in circuit-closing position and is operative manually to a circuit-opening position. The switch device 164 may be of any other suitable type such as a common snap switch.

The electromagnet 171 of the relay 161, the electromagnet 177 of the magnet valve device 162 and the electromagnet 187 of the magnet valve device 29 are connected in parallel relation between a common wire 191 and the negative or grounded terminal of the battery 86. The pressure switch 163 and the manually operated switch 164 are connected in series relation in a wire 192 which is connected at one end to the non-grounded terminal of the signal lamp 26 and at the other end to the wire 191. The non-grounded terminal of the signal lamp 27 is connected by a wire 193 to the wire 192, the rectifier 165 being connected in the wire 193 in such manner as to permit the flow of current through wire 193 toward the wire 192 and to prevent the flow of current through the wire 193 in the opposite direction. The rectifier 165 is provided in order to prevent the illumination of the signal lamp 27 when the contact member 96 of the relay 24a is shifted to circuit-closing position.

In operation, assuming that the operator has operated the brake valve device 12 to effect a service application of the brakes, fluid under pressure supplied to the brake cylinder 13 through the supply pipe 53 flows to the chamber 189 of the pressure switch 163 through chamber 179 of the magnet valve device 162 past the lower open valve seat of the double beat valve 175, the chamber 176 and pipe 190, and causes the contact member 186 to be shifted to circuit-opening position when the pressure in the brake cylinder exceeds a certain uniform low pressure, such as two or three pounds per square inch.

Subsequently when the contact member 82 on the pendulum 81 of the retardation controller 17 disengages the contact finger 87 as the train is retarded at a rate of, for example, three miles per hour per second, the circuit for energizing the electromagnet of the relay 24a and the electromagnet 46 of the cut-off magnet valve device 38 is interrupted so that the contact member 96 of the relay 24a shifts to circuit-closing position to cause illumination of the signal lamp 26. Also, the deenergization of the cut-off magnet valve device 38 causes seating of the cut-off valve 43 of the cut-off magnet valve device 38. As previously pointed out, the rectifier 165 prevents the flow of current through the signal lamp 27 at this time. Furthermore, in view of the fact that the contact member 186 of the pressure switch 163 is in circuit-opening position, the relay 161, and the magnet valve devices 162 and 29 remain deenergized.

Subsequently, as the contact member 82 of the retardation controller 17 disengages the contact finger 88, the electromagnet 57 of the release magnet valve devices 39 and the electromagnet of the relay 25a are deenergized. As a result the release valve 56 of each of the magnet valve mechanisms 16, 16a and 16b is unseated and, if the brake cylinder pressure exceeds the pressure setting of the safety valve 42, the pressure in the brake cylinder is reduced thereto.

The shifting of the contact member 99 of the relay 25a to circuit-closing position completes the circuit for energizing the signal lamp 27 and the signal lamp is accordingly illuminated.

Thus, as long as the brake control circuits including the train wires 19 to 21 remain unbroken and without a fault thereon, the signal lamps 26 and 27 function as in the embodiment shown in Fig. 1 to indicate the operative condition of the retardation controller 17.

In the event that a fault on or break of one of the control circuits occurs while the train is traveling along the road with the brakes released, the corresponding relay 24a or 25a included in circuit therewith is deenergized. The deenergization of either of the relays 24a or 25a results in the energization of the electromagnet 171 of the relay 161, the electromagnet 177 of the magnet valve device 162 and the electromagnet 107 of the magnet valve device 29. It will be apparent that this energizing circuit extends from the positive terminal of the battery 86, in parallel through one or the other of the contact members 96 or 99 of relays 24a and 25a, respectively, to the wire 192, thence in series through the contact member 186 of the pressure switch 163 and the switch 164, to the wire 191 and thereafter, in parallel, through the respective electromagnets of the relay 161, of the magnet valve device 162 and of the magnet valve device 29 to the negative terminal of the battery 86 through the ground connection in the manner shown.

Upon energization of the electromagnet 171 of the relay 161, both of the contact members 172 and 173 are shifted to circuit-opening position and, consequently, the energizing circuit for each of the relays 24a and 25a is interrupted. Thus, assuming that the relay 24a was at first deenergized, the pick-up of the relay 161 results in the deenergization of the relay 25a. Conversely, if the relay 25a is first deenergized due to a fault or the break in the train wires, then the energization of the relay 161 results in the deenergization of the relay 24a. Thus, in any case, both of the signal lamps 26 and 27 become illuminated and the circuit for energizing the electromagnet of the cut-off magnet valve devices 38 and the release magnet valve devices 39 are both interrupted. Accordingly, the cut-off valve 43 and the release valve 56 of the magnet valve mechanism 16 and corresponding valve mechanisms are seated and unseated, respectively, in the manner described for the embodiment shown in Fig. 1.

The energization of the electromagnet 177 of the magnet valve device 162 causes the double beat valve 175 to be shifted from its upper seated position to its lower seated position, so that the chamber 189 of the pressure switch 163 is connected to atmosphere through the pipe 191, chamber 176, past the open upper valve seat of the double beat valve 175, chamber 181, and exhaust port 182. Thus the energization of the magnet valve device 162 insures that the pressure switch 163 will remain in circuit-closing position once a fault on or a break of the train wires occurs.

Energization of the electromagnet 107 of the magnet valve device 29 results in the timed reduction of the pressure in the chamber 123 of the application valve device 31 in exactly the same manner as described for the embodiment shown in Fig. 1. Thus the application valve device 31 is operated after a certain time interval to effect a reduction of the pressure in the brake pipe 11 at an emergency rate, and the triple valve device 15 thereupon operates to supply fluid under pressure from the auxiliary reservoir 14 to the brake cylinder 13 in the manner previously described for the embodiment shown in Fig. 1 past the inshot valve device 41 of the magnet valve mechanism 16. It will be apparent that since the double beat valve 175 of the magnet valve device 162 is in its lower seated position, the brake cylinder pressure established is ineffective to cause the contact member 186 of the pressure switch 163 to be shifted to circuit-opening position.

When the pressure in the brake cylinder attains a pressure sufficient to cause seating of the ball check valve 65 of the inshot valve device 41, the supply of fluid under pressure to the brake cylinder is cut off since the cut-off valve 43 of the magnet valve device 38 is already seated.

As in the case of the equipment shown in Fig. 1, the operator upon observing the simultaneous illumination of the signal lamps 26 and 27 and upon sensing the automatic emergency application of the brakes, shifts the handle of the brake valve device 12 out of release position into lap, service application position or emergency application position to prevent the recharge of the brake pipe 11 to release the brakes as well as the continued exhaust of fluid under pressure, supplied to recharge the brake pipe, by way of the application valve device 31, volume reservoir 33, past the unseated valve 105 of the magnet valve device 29, and the exhaust port 112 of the magnet valve device 29.

If, after the train has been brought to a complete stop by the automatic emergency application of the brakes in the manner just described, the operator desires to release the brakes and proceed either after repairing the fault or broken train wire or without removing the fault or repairing the broken wire, he must first open the switch 164. Upon the opening of the switch 164, the relay 161, the magnet valve device 162 and the magnet valve device 29 are all deenergized and thereby restored to their normal condition. The deenergization of the magnet valve device 162 causes the pressure of the fluid in the brake cylinder to be supplied to the pressure switch 163 and shift the contact member 186 thereof to circuit-opening position.

The deenergization of the magnet valve device 29 causes the valve 105 thereof to be reseated so that the operator may restore the brake valve device 12 to its normal brake release position in which communication is established for charging the brake pipe 11. Since the exhaust communication through the port 112 of the magnet valve device 29 from the chamber 123 of the application valve device 31 is now closed, the supply of fluid under pressure to the brake pipe will not cause unseating of the valve piston 116 of the application valve device 31 and thus the brake pipe 11 will be restored to its normal pressure. The triple valve 15 is thus operated to restore the auxiliary reservoir 14 to its normal pressure and to establish communication through which fluid under pressure is exhausted from the brake cylinder to atmosphere past the ball check valve 65 of the inshot valve device 41, which results in the release of the brakes.

Thereafter, the train may proceed at a reduced speed until such time as the fault or break in the control circuit is removed or repaired, the maximum degree of brake cylinder pressure attainable, however, being limited according to the pressure at which the ball check valve 65 of the inshot valve device 41 seats.

It will be understood that the knife switch 164 must remain in open position if the operator desires to cause the train to proceed without immediately removing the fault or repairing the break in the control circuits, because otherwise upon the release of fluid under pressure from the brake cylinder, the pressure switch 163 will reclose and the equipment will then be conditioned so that the automatic emergency application of the brakes will be repeated. When the fault or the break in the control circuits is removed or repaired, the knife switch 164 is reclosed to restore the retardation control circuits to their normal condition shown in the drawings.

*Summary*

Summarizing, it will be seen that I have disclosed three equipments embodying my invention, each of these equipments including signaling means for indicating a fault or break in the brake control circuits. In two of the embodiments the signal devices function in a dual capacity, being effective when there is no fault or break in the brake control circuits to indicate the operative condition of a retardation controller device as long as the degree of brake application established exceeds a certain uniform degree. In the remaining embodiment, a pressure switch responsive to brake cylinder pressure is provided for preventing operation of the signal devices when the brake cylinder pressure exceeds a certain uniform low pressure, thus restricting the function of the signal devices to indicating solely the occurrence of a fault or break in the brake control circuits.

While I have disclosed only three embodiments of my invention, it will be apparent that various omissions, additions or modifications may be made in the embodiments shown without departing from the spirit of my invention. It is accordingly not my intention to limit the scope of my invention except as it is necessitated by the scope of the prior art.

Having now described my invention, what I claim as new and desire to secure by Letters Patent is:

1. A vehicle brake system, comprising in combination a normally closed circuit, electroresponsive means operating on said normally closed circuit for controlling the degree of application of the brakes, a retardation controller operative upon the retardation of the vehicle to cause interruption of the said normally closed circuit and consequent operation of the electroresponsive means to control the degree of the application of the brakes, means operative automatically upon interruption of said normally closed circuit for effecting an emergency application of the brakes, and means effective as long as the application of the brakes exceeds a certain uniform degree for preventing operation of said emergency application means.

2. In a vehicle brake system, means manually operative to effect an application of the brakes, a normally closed circuit, electroresponsive means operating on said normally closed circuit for controlling the supply and release of fluid under pressure to control the degree of the application of the brakes independently of the manually operative means, a retardation controller effective upon the retardation of the vehicle in excess of a certain rate for effecting interruption of the said normally closed circuit and the consequent operation of the electroresponsive means to control the degree of the brake application, means operative automatically upon the interruption of said normally closed circuit for effecting an emergency application of the brakes, and means effective as long as the brake application exceeds a certain uniform degree for preventing operation of the emergency application means.

3. In a vehicle brake system, a normally closed brake control circuit, signal means operated upon interruption of said normally closed circuit, means operative upon interruption of said normally closed circuit to effect an emergency application of the brakes, and means effective as long as the brake application exceeds a certain uniform degree for preventing operation of the emergency application means upon interruption of the normally closed circuit.

4. In a vehicle brake system, a normally closed brake control circuit, a retardation controller operative when the vehicle exceeds a certain uniform rate of retardation for interrupting said normally closed circuit to control the degree of application of the brakes, signal means operated upon interruption of said normally closed circuit, means operative upon interruption of said normally closed circuit for effecting an emergency application of the brakes, and means effective as long as the brake application exceeds a certain uniform degree for preventing operation of the emergency application means.

5. In a vehicle brake system, means operative to cause fluid under pressure to be supplied through a communication to effect application of the brakes, a first normally closed circuit, a second normally closed circuit, magnet valve means operating on said first circuit and operative upon interruption of said first circuit to close the communication through which fluid under pressure is supplied to effect application of the brakes, a second magnet valve means operating on the said second circuit and effective upon interruption of the said second circuit to release fluid under pressure from said communication to effect release of the brakes, a retardation controller operative upon the retardation of the vehicle in excess of a certain uniform rate for interrupting said first circuit and upon retardation of the vehicle at a second certain uniform rate higher than the first said uniform rate for interrupting said second circuit, signal means operated upon interruption of said first circuit, different signal means operated upon interruption of said second circuit, means operated upon interruption of either of said circuits for effecting an emergency application of the brakes, and means effective as long as the brake application exceeds a certain uniform degree for preventing operation of the emergency application means.

6. In a vehicle brake system, a brake cylinder, means providing a communication through which fluid under pressure is supplied to the brake cylinder to effect an application of the brakes, electroresponsive valve means controlling the supply of fluid under pressure through said communication to the brake cylinder and the release of fluid under pressure from the brake cylinder through the said communication for controlling the degree of the application of the brakes, a normally closed circuit on which said electroresponsive means operates, a retardation controller operative upon retardation of the vehicle at a rate in excess of a certain uniform rate for interrupting said circuit, signal means operated upon interruption of said normally closed circuit, means operated upon interruption of said normally closed circuit for effecting a supply of fluid under pressure to the brake cylinder to effect an emergency application of the brakes, and means effective when the pressure in the brake cylinder exceeds a certain uniform pressure for preventing said emergency application means from effecting an emergency application of the brakes.

7. A vehicle brake system comprising a normally closed brake control circuit, means operative upon failure of said brake control circuit for effecting an emergency application of the brakes, and means effective as long as a brake application exceeding a certain uniform degree exists for preventing the said emergency application means from effecting an emergency application of the brakes.

8. In a vehicle brake system, a normally closed brake control circuit, signal means operated upon failure of said circuit, and means effective as long as a brake application exceeding a certain uniform degree exists for preventing the operation of the signal means.

9. In a vehicle brake system, a normally closed brake control circuit, a retardation controller operative upon the retardation of the vehicle at a rate in excess of the certain uniform rate for interrupting said circuit, means operative upon failure of said circuit as long as the brake application is less than a certain uniform degree for effecting an emergency application of the brakes, and means effective to delay for a uniform interval of time the operation of the said emergency application means following the failure of the said circuit, to avoid undesired operation thereof upon accidental and undesired interruption of the circuit by the retardation controller.

10. In a vehicle brake system, a normally closed brake control circuit, electroresponsive means effective upon failure of the said circuit for causing an emergency application of the brakes, and a pressure operated switch device effective to prevent operation of the electroresponsive means when the brake application exceeds a certain uniform degree.

11. In a vehicle brake system, a normally closed brake control circuit, a normally open circuit, means operating on said normally closed brake control circuit effective upon interruption of said normally closed circuit for closing said normally open circuit, means operative upon the closing of said normally open circuit for effecting an emergency application of the brakes, and means effective to maintain the normally open circuit open as long as the brake application exceeds a certain uniform degree.

12. In a vehicle brake system, a normally closed brake control circuit, a normally open circuit, means effective to close the normally open circuit upon interruption of the normally closed brake control circuit, means operating on the normally open circuit and energized upon the completion of the normally open circuit for causing an emergency application of the brakes to be effected, and a pressure operated switch device in said normally open circuit for maintaining the normally open circuit open as long as the brake application exceeds a certain uniform degree.

13. In a vehicle brake system, a normally closed brake control circuit, a brake cylinder, means operating on said normally closed circuit for controlling the degree of pressure in the brake cylinder, electroresponsive means effective when energized to cause fluid under pressure to be supplied to the brake cylinder to effect an emergency application of the brakes, means operative upon the failure or interruption of said normally closed brake circuit for causing the said electroresponsive means to be energized, a pressure operated switch device operated in response to a certain uniform pressure to prevent energization of the said electroresponsive means, and a magnet valve device normally conditioned to establish a communication through which the pressure operated switch device is subjected to the pressure in the brake cylinder and operated upon energization of the said electroresponsive means to cut off the communication between the brake cylinder and the pressure operated switch and release fluid under pressure from said pressure operated switch device to prevent operation thereof by the pressure in the brake cylinder upon an emergency application of the brakes.

14. In a vehicle brake system, a normally closed brake control circuit, a brake cylinder, means operating on said normally closed circuit for controlling the degree of pressure in the brake cylinder, electroresponsive means effective when energized to cause fluid under pressure to be supplied to the brake cylinder to effect an emergency application of the brakes, means operative upon the failure or interruption of said normally closed brake circuit for causing the said electroresponsive means to be energized, a pressure operated switch device operated in response to a certain uniform pressure to prevent energization of the said electroresponsive means, and a magnet valve device normally conditioned to establish a communication through which the pressure operated switch device is subjected to the pressure in the brake cylinder and operated upon energization of the said electroresponsive means to cut off the communication between the brake cylinder and the pressure operated switch and release fluid under pressure from said pressure operated switch device, to prevent operation thereof by the pressure in the brake cylinder upon an emergency application of the brakes, and manually operative switch means operated at will to effect deenergization of the electroresponsive means.

15. In a vehicle brake system, means providing a communication through which fluid under pressure is supplied to effect an application of the brakes, a cut-off magnet valve device operative to close said communication, a release magnet valve device operative to release fluid under pressure from said communication to reduce the degree of application of the brakes, a normally closed circuit on which the said cut-off magnet valve device operates, another normally closed circuit on which the said release magnet valve operates, and means operative upon interruption of one or the other of said normally closed circuits for effecting interruption of both said circuits.

16. In a vehicle brake system, means providing a communication through which fluid under pressure is supplied to effect an application of the brakes, a cut-off magnet valve device operative to close said communication, a release magnet valve device operative to release fluid under pressure from said communication to reduce the degree of application of the brakes, a normally closed circuit on which the said cut-off magnet valve operates, another normally closed circuit on which the said release magnet valve operates, and means operative upon interruption of one or the other of said normally closed circuits for effecting interruption of both said circuits, and means effective when the brake application exceeds a certain uniform degree for rendering the last said means non-effective.

ELLIS E. HEWITT.